W. W. BLAKESLEE.
ELEVATOR.

No. 189,914.

2 Sheets—Sheet 2.

Patented April 24, 1877.

UNITED STATES PATENT OFFICE.

WILLIAM W. BLAKESLEE, OF SPRING LAKE, MICHIGAN.

IMPROVEMENT IN ELEVATORS.

Specification forming part of Letters Patent No. 189,914, dated April 24, 1877; application filed October 31, 1876.

*To all whom it may concern:*

Be it known that I, WILLIAM W. BLAKESLEE, of Spring Lake, in the county of Ottawa and State of Michigan, have invented certain new and useful Improvements in Elevators; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of an elevator, as will be hereinafter more fully set forth.

Figure 1:
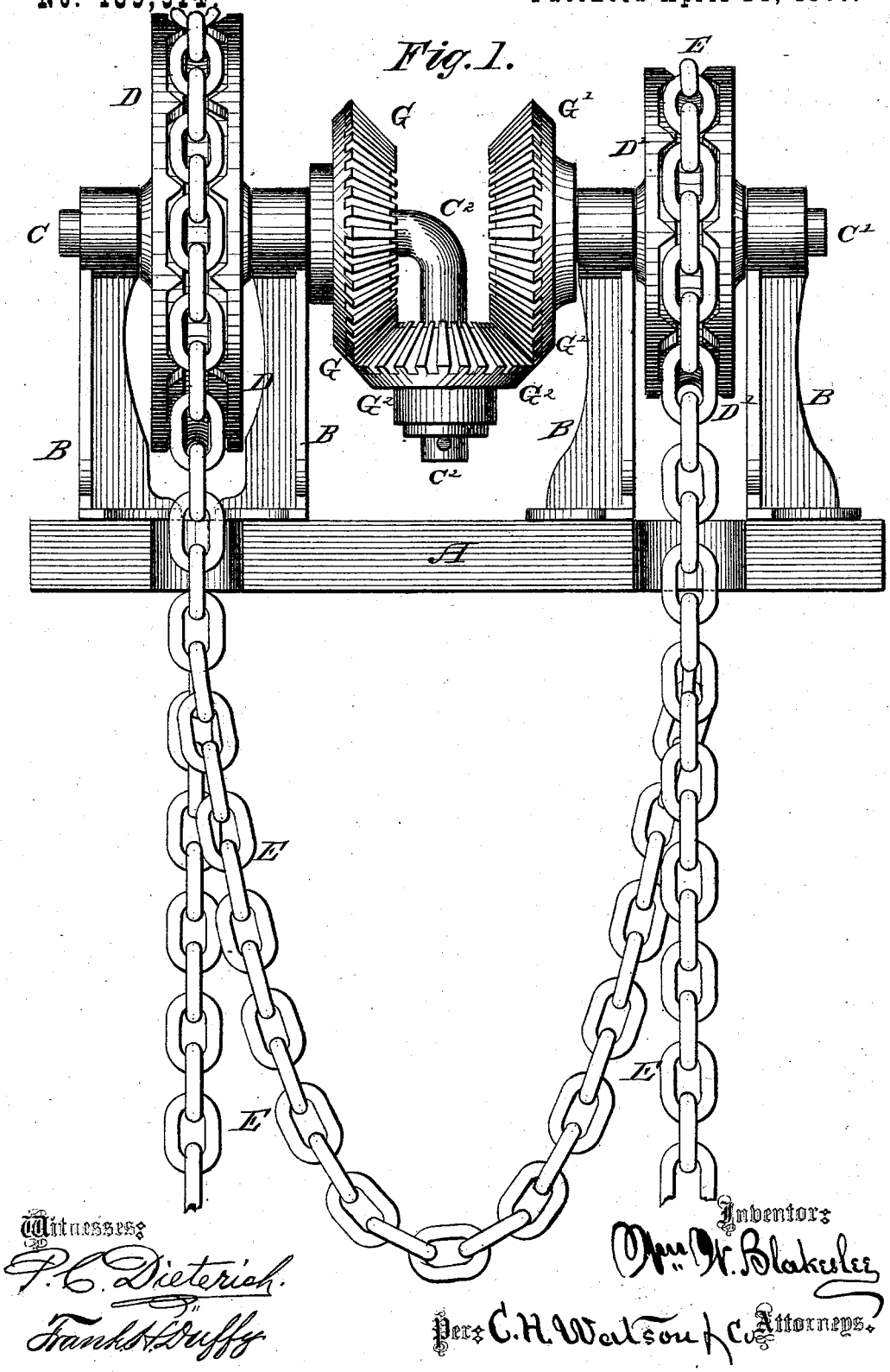
Figure 2:
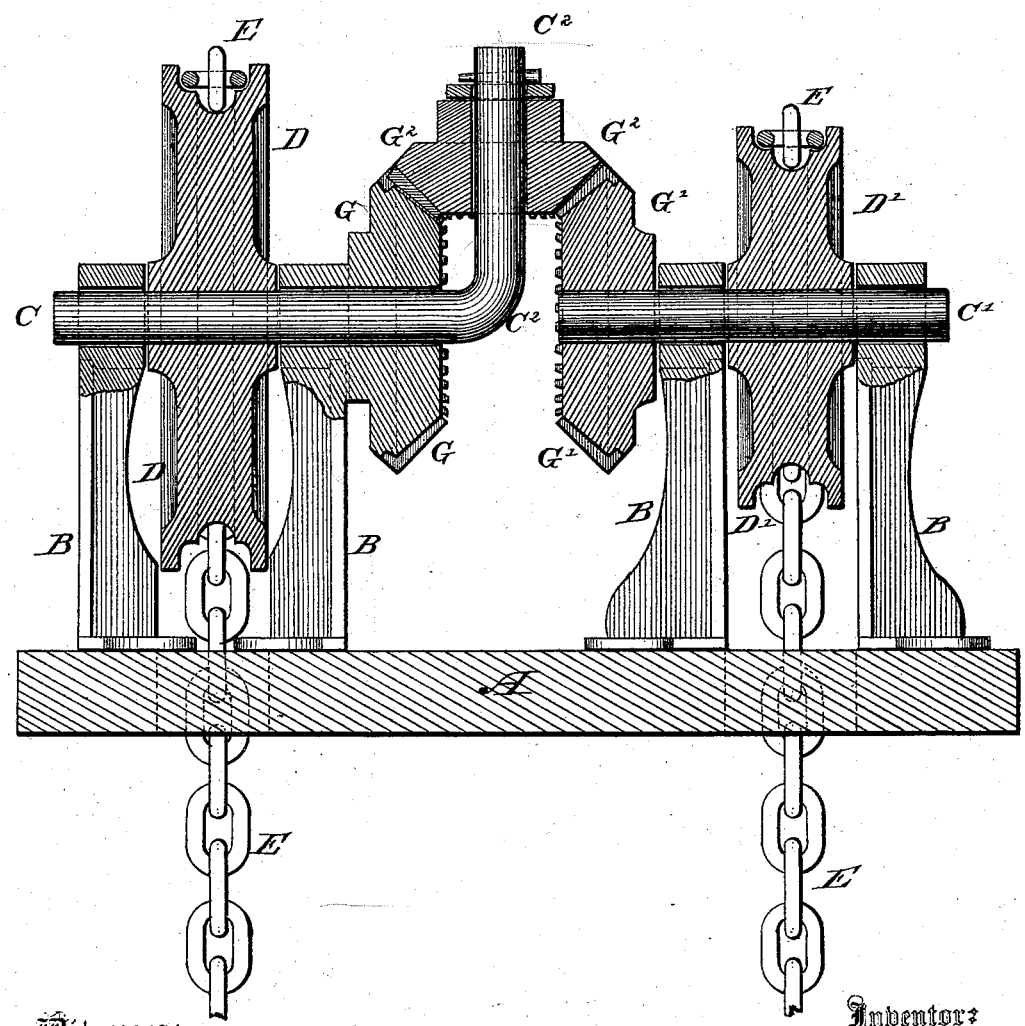

In the annexed drawings, Figure 1 is a front elevation of my machine. Fig. 2 is a longitudinal section of the same.

A represents the bed of my machine, near each end of which are two vertical standards, B B. These standards form in their upper ends bearings for two horizontal shafts, C and $C^1$, as shown.

On the shafts C, between its bearings, is secured a large chain-wheel, D, and on the shaft $C^1$, between its bearings, is secured a smaller chain-wheel, $D'$; and around these two wheels is passed a chain, E, the middle of the chain passing from one side of one wheel to the opposite side of the other wheel.

The inner end of the shaft C is turned at right angles, forming a crank or lever, upon which is placed a bevel-wheel, $G^2$. This wheel meshes with one bevel-wheel, $G^1$, secured on the inner end of the shaft $C^1$, and with another bevel-wheel, G, placed around the shaft C, and secured to the inner bearing for the same.

As the crank or lever $C^2$ of the shaft C is turned the wheel D is also rotated, and the bevel cog-wheel $G^2$ is turned on its axis by traversing the face of the stationary wheel G, thereby rotating the wheel $G^1$, and also turning the shaft $C^1$ and wheel $D'$.

By so arranging the parts that the diameters of the beveled cog-wheels can be increased and the crank or lever $C^2$ lengthened, the power can be indefinitely increased.

In all cases the strain upon the middle cog-wheel $G^2$ is divided on opposite sides of the wheel, so that only one-half of the power is on each side thereof.

This machine may be used for a variety of purposes—for instance, in elevators, stump-extractors, &c.; and the object to be moved may be connected to the central part of the chain, or to the ends thereof, as may be required.

If desired, the gear $G^1$ may be moved back and enlarged, and a supplemental gear be placed on the lever $C^2$, outside of the bevel-gear $G^2$, which would increase the power or leverage.

Having thus fully described my invention, what I claim as new, and desire to secure by Letters Patent, is—

The combination of the bed A, with standards B B, the shaft C, with crank $C^2$ and chain-wheel D, the shaft $C^1$, with chain-wheel $D'$ and gear-wheel $G^1$, the stationary gear-wheel G, the gear-wheel $G^2$ on the crank $C^2$, and the chain E, passed around the chain-wheels D $D'$, all substantially as and for the purposes herein set forth.

In testimony that I claim the foregoing as my own I affix my signature in presence of two witnesses.

WM. W. BLAKESLEE.

Witnesses:
 C. H. WATSON,
 FRANK H. DUFFY.